| United States Patent [19] | | [11] | 4,102,876 |
|---|---|---|---|
| Brenner et al. | | [45] | Jul. 25, 1978 |

[54] QUATERNARY PHOSPHONIUM IONOMERS

[75] Inventors: Douglas Brenner, Livingston; Alexis A. Oswald, Mountainside, both of N.J.

[73] Assignee: Exxon Research & Engineering Co., Linden, N.J.

[21] Appl. No.: 788,312

[22] Filed: Apr. 18, 1977

[51] Int. Cl.² .................. C08G 75/00; C08L 19/00
[52] U.S. Cl. ..................... 526/19; 260/37 R; 526/20; 526/21; 526/22; 526/27; 526/28
[58] Field of Search ............ 260/79.3 R, 2 P, 2.1 E, 260/2.2 R, 37 R

[56] References Cited

U.S. PATENT DOCUMENTS

| 2,764,563 | 9/1956 | McMaster et al. ............ 260/2.2 R |
|---|---|---|
| 3,055,729 | 9/1962 | Richter et al. .................. 260/2.2 R |
| 3,208,984 | 9/1965 | Dekking ......................... 260/2.1 R |
| 3,235,536 | 2/1966 | Garner ............................ 260/2 P |
| 3,235,591 | 2/1966 | Goodrow ........................ 260/2 P |
| 3,577,357 | 5/1971 | Winkler .......................... 260/2.2 R |
| 3,821,137 | 6/1974 | Lishevskaya et al. .......... 260/2.2 R |
| 3,839,237 | 10/1974 | Battaerd et al. ................ 260/2.1 R |
| 3,929,849 | 12/1975 | Oswald ........................... 260/448 C |
| 4,007,149 | 2/1977 | Burton et al. .................. 260/79.3 R |

Primary Examiner—Ronald W. Griffin
Attorney, Agent, or Firm—Richard E. Nanfeldt

[57] ABSTRACT

Ionomers comprising quaternary phosphonium counterion salts of acids having anionic groups covalently bonded to carbon atoms comprising a backbone chain of a polymer, or to acyclic, alicyclic or aromatic radicals which are pendant to the backbone chain of the polymer are novel compositions of matter. The ionomers vary in properties from water-soluble polyelectrolytes useful as thickening agents to thermoplastic elastomers which can be extruded, injection molded, vacuum formed, etc. at elevated temperatures. The elastomers are useful as specialty and general purpose rubbers.

24 Claims, No Drawings

QUATERNARY PHOSPHONIUM IONOMERS

BACKGROUND OF THE INVENTION

1. Field of the Invention

This invention relates to ionic polymers. More particularly, this invention relates to quaternary phosphonium salts of anionic polymers, i.e. polymers containing covalently bound negatively charged groups. Most particularly, this invention is concerned with novel compositions of matter comprising quaternary phosphonium salts of polymers having incorporated therein one or more covalently bonded anionic radicals selected from the group consisting of sulfonic, carboxylic and phosphonic acid radicals.

The ionic salts of this invention may be schematically represented, for the case where the anionic group is a sulfonic acid radical, as follows:

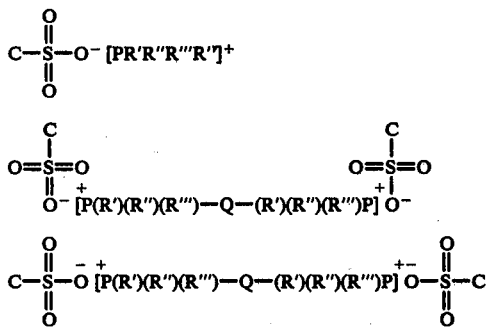

wherein C is one of a plurality of carbon atoms comprising a portion of the polymer. Backbone chain of carbon atoms or is in an acyclic, alicyclic, or aromatic radical which is pendant to the backbone chain and wherein said $\sim C \sim$ is (1.) in a single polymer molecule, (2.) in the same polymer molecule, and (3.) in different polymer molecules; $R'$, $R''$, $R'''$ and $R''''$ are independently selected from the group consisting of $C_1$ to $C_{50}$ straight and branched chain acyclic, alicyclic, aryl, alkylaryl and arylalkyl radicals and substituted functional derivatives thereof; and Q is selected from the group consisting of $C_1$ to $C_{40}$ divalent straight and branched chain alkylene cycloalkylene, arylene, dialkylene-arylene radicals and substituted functional derivatives thereof and $-(CHY)_n-Z_m-(CHY)_n$ wherein Z is a hetero atom selected from the group consisting of oxygen and sulfur, $m$ is zero or one, Y is hydrogen or said $C_1$ to $C_{50}$ radicals or substituted functional derivatives of said radicals and $n$ is an integer of from 1 to 10.

While the mono and divalent quaternary phosphonium salts of anionic polymers shown in the above formulae are preferred, this invention also includes polyvalent quaternary phosphonium salts of anionic polymers wherein the polyvalent phosphonium cations have the general formulae:

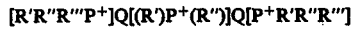

wherein $R'$, $R''$, $R'''$ and Q have the same value and significance as in formulas 2. and 3. above; and

wherein $v$ is the valency of a polyvalent hydrocarbon radical T, and $R'$, $R''$ and $R'''$ have the same value and significance as $R'$, $R''$, $R'''$ and $R''''$ in the above formulas, vs. 3 to 10, preferably 3 or 4.

Using sulfonated polymers as a preferred example of the anionic polymers of this invention, the ionically cross-linked ionomers of this invention are readily prepared from the free-sulfonic acid form by direct neutralization, either in bulk or in solution, with a quaternary phosphonium hydroxide, or by double decomposition (metathesis) of a cationic salt of the sulfonic acid with a quaternary phosphonium salt of an acid which is weaker (i.e. has a lower $K_a$) than the sulfonic acid, or by double decomposition in a multiphase fluid medium in which the salt of the displaced counterion is selectively removed from the phase containing the polymer to a phase in which the phosphonium ionomer is substantially insoluble.

The properties and utility of the ionic salts of this invention vary over a wide range depending on the structure of the anionic polymer, the average molecular weight and molecular weight distribution, the degree of neutralization of the anionic groups in the polymer, the mole concentration of the quaternary phosphonium salt groups in the polymer, and in particular, the type and variety of the substituents attached to the phosphorus. The ionic salts may vary from water-soluble polyelectrolytes useful as adhesives and thickening agents to elastomers or hard resins which are thermoplastic at elevated temperatures permitting the products to be extruded, injection molded, vacuum formed and sheeted.

A particularly useful form for an ionomer is an elastomer (water-insoluble) which can be melt fabricated and then used without curing, and which can be reprocessed at elevated temperature since they don't contain covalent crosslinks.

2. Prior Art

Anionic polymers and their salts, prepared either by covalently appending anionic groups to a preformed polymer, as for example, by sulfonation or grafting of anionic monomers, or prepared by the mono or interpolymerization of monomers having acid moieties are old in the art but no references in the patent or general chemical literature have been found disclosing quaternary phosphonium salts of anionic polymers. A recently published book, "Ionic Polymers", L. Holliday, Editor, John Wiley & Sons, New York, New York, 1975 reviews the field and describes a variety of anionic polymers suitable for the preparation of the quaternary phosphonium salts of this invention.

SUMMARY OF THE INVENTION

This invention describes the preparation and utility of novel ionic polymers comprising quaternary phosphonium salts of polymers having one or more anionic groups covalently bonded to a carbon atom comprising the polymer. Preferred anionic groups are sulfonic acid, carboxylic acid and phosphonic acid groups.

DESCRIPTION OF THE PREFERRED EMBODIMENTS

Anionic polymers which are particularly suitable for the preparation of the quaternary phosphonium ionomers of this invention may be broadly divided into those polymers having:

I. One or more sulfonic acid groups covalently linked to one or more carbon atoms comprising the polymer molecule; and II. One or more carboxylic acid groups covalently linked to one or more carbon atoms comprising the polymer molecule.

I. Sulfonic Acid Polymers

Polymers having sulfonic acid groups covalently bonded to carbon atoms comprising the polymer can be prepared by the sulfonation of a pre-formed hydrocarbon polymer by sulfonation or grafting reagents, or by the homopolymerization or interpolymerization of a monomer incorporating a sulfonic acid group or salt of a sulfonic acid. As used herein the term "interpolymer" denotes a polymer comprising more than one monomer, e.g. copolymer, terpolymer, etc. in which the arrangement of the monomer moieties may be random, alternating, block, graft, stereoregular and the like. Suitable non-limiting examples are grouped as follows:

A. Pre-Formed Polymers a. Homopolymers and interpolymers of one or more acyclic and alicyclic mono-olefins in which the polymers are essentially free of unsaturation (except for chain-end unsaturation) prepared with the aid of cationic, free-radical, alkali metal anionic, or Ziegler-Natta catalysts. Non-limiting examples include homopolymers and interpolymers of $C_2$ to $C_{18}$ olefins such as ethylene, propylene, isobutene, butene-1, pentene-1, hexene-1, 4-methylpentene-1, cyclopentene, bicyclo(2,2,1) 2-heptene, dodecene-1 and octadecene-1. Commercially available polymers in this group are polyethylene, polypropylene, ethylene-propylene rubber (EPR) and polyisobutylene.

b. Homopolymers and interpolymers of one or more alkenyl aromatic hydrocarbon monomers and substituted derivatives thereof having the general formulae Ar—C(R)=CHR' and Ar—CHR—CH=CH$_2$ wherein Ar is a monovalent sulfonatable aromatic radical and R and R' are independently selected from the group consisting of hydrogen and a methyl radical. Non-limiting examples of monomers which can be polymerized with the aid of a variety of catalyst systems to yield polymers which are suitable for the practice of this invention include: styrene, α-methyl styrene, propenyl benzene, allyl benzene, vinyl toluene, vinyl naphthalene and vinyl ethylbenzene.

c. Interpolymers of one or more $C_4$ to $C_{10}$ conjugated diolefins with one or more $C_8$ to $C_{12}$ vinyl aromatic hydrocarbons. Non-limiting examples include: copolymers of 1,3-butadiene with styrene, e.g. SBR rubber and graft polymers of styrene on polybutadiene.

d. Random interpolymers of one or more $C_8$ to $C_{12}$ vinyl aromatic hydrocarbons comprising about 40 to 60 weight percent of the vinyl aromatic with one or more $C_4$ to $C_{10}$ Type III mono-olefins. Non-limiting examples include the PARAPOL S resins comprising interpolymers of styrene and isobutylene.

e. Random elastomeric interpolymers of one or more $C_4$ to $C_{10}$ conjugated diolefins with one or more $C_4$ to $C_{10}$ Type III mono-olefins. Non-limiting examples include the family of BUTYL rubbers comprising interpolymers of isobutylene with butadiene, isoprene, piperylene, 1,3-hexadiene, 2,3-dimethyl-1,3-butadiene and cyclopentadiene.

f. Homopolymers and interpolymers of one or more $C_{10}$ acyclic and alicyclic monoterpenes and $C_{15}$ sesquiterpenes prepared with the aid of cationic, Ziegler-Natta and free-radical (e.g. gamma radiation) catalysts. Non-limiting examples of suitable monomers include: β-pinene, dicyclopentadiene, vinyl cyclohexene, dipentene, myrcene, ocimene and β-farnesene.

g. Homopolymers and interpolymers of one or more $C_4$ to $C_{10}$ conjugated diolefins. Non-limiting examples of suitable monomers include: 1,3-butadiene; isoprene; piperylene; 2,3-dimethyl buta-1,3-diene; and cyclopentadiene. Enchainment, using a variety of catalysts for the polymerization, e.g. alkali metal anionic and Ziegler-Natta catalysts includes 1,4-cis; 1,4-trans; 1,2- and 3,4-types of addition and random mixtures thereof. Non-limiting examples of commercially available polymers include: natural rubber and synthetic cis-1,4-polybutadiene and cis-1,4-polyisoprene.

h. Random interpolymers of one or more Type I $C_2$ to $C_{18}$ mono-olefins and one or more $C_6$ to $C_{12}$ acyclic or alicyclic non-conjugated diolefins. Non-limiting examples of commercially available EPDM polymers include: terpolymers of ethylene, propylene and 1,4-hexadiene (NORDEL); terpolymers of ethylene, propylene and 5-ethylidene-2-norbornene (VISTALON) and ethylene, propylene and dicyclopentadiene (DUNLOP).

Olefin types are in accordance with the Schmidt and Boord Classification, J.A.C.S. 54, 751 (1932).

B. Polymers From Monomers Incorporating Sulfonic Acids

While the range and variety of monomers which incorporate sulfonic acid groups or their salts is not large at the present time, the use of these monomers permit the preparation of a variety of homopolymers and interpolymers that cannot be easily prepared by direct sulfonation of pre-formed polymers. Non-limiting examples of monomers incorporating sulfonic acids or their salts include: vinyl sulfonic acid; allyl sulfonic acid; methallyl sulfonic acid; 2-allyl oxyethane sulfonic acid; 2-hydroxy-3-allyl oxy propane sulfonic acid and styrene sulfonic acid. Vinyl sulfonic acid readily forms a water-soluble homopolymer and interpolymers with acrylonitrile, acrylic acid amide, vinyl acetate, acrylic acid esters and N-vinyl pyrrolidone, using a variety of catalyst systems. Styrene sulfonic acid readily polymerizes to yield a water-soluble polymer. The above monomers or their salts are preferably interpolymerized with hydrocarbons, to provide the polymeric sulfonic acids or their salts. The use of phosphonium sulfonate monomers directly provide the novel compositions of this invention.

C. Sulfonation of Pre-Formed Polymers

Processes for the sulfonation of hydrocarbon polymers which are: (a) essentially free of olefinic unsaturation except for chain-end unsaturation, or (b) possess a measurable degree of olefinic unsaturation which may be in the polymer backbone chain of carbon atoms or is in an acyclic alkenyl or alkylidene radical or alicyclic radical which is pendant to the backbone chain of carbon atoms, or (c) possess aryl or arylene radicals which comprise the backbone chain of carbon atoms or are pendant to the backbone chain of carbon atoms are old in the art.

Polymers which are free of unsaturation but have a measure of chain branching such as polyethylene, polypropylene, polyisobutylene and EPR rubbers may be sulfonated in solution by means of $SO_2$ and $O_2$ with the aid of a free-radical initiator (sulfoxidation Reaction), or sulfochlorinated in solution by means of $SO_2$ and $Cl_2$ with the aid of a free-radical initiator (Reed Reaction) followed by hydrolysis of the sulfonyl chloride to the free sulfonic acid or a salt of the sulfonic acid, or by means of complexes or cordination compounds of $SO_3$ with Lewis Bases such as triethyl phosphate as disclosed in U.S. Pat. No. 3,205,285 which is herein incorporated by reference. The same reagent has been disclosed in U.S. Pat. Nos. 3,072,618 and 3,072,619 for the sulfonation of polystyrene and in U.S. Pat. No. 3,432,480 for the sulfonation of cis-1,4-polybutadiene. The above three patents and U.S. Pat. No. 3,642,728 which discloses a variety of complexing agents for the sulfonation of nonaromatic polymers such as BUTYL rubber are hereby incorporated by reference. U.S. Pat. No. 3,836,511 which discloses the sulfonation of unsaturated elastomers using acetyl sulfate is also incorporated by reference.

The sulfonations are carried out in solution in an inert hydrocarbon solvent such as hexane, heptane or isooctane, or chlorinated solvents such as ethylene dichloride or chlorobenzene at temperatures in the range of about −40° to 100° C. depending on the reactivity of the sulfonation reagent employed.

Sulfonated polymers suitable for the practice of this invention may have sulfur contents as high as 29.7 wt.% in the case of a homopolymer of vinyl sulfonic acid or ~17.2 wt. % in the case of a homopolymer of styrene sulfonic acid and as low as 0.1 wt. % in the case of a sulfonated polyisobutylene or polypropylene. Ionomers which are melt fabricated are most useful when they have a concentration of ionic groups which is between 0.2 and 8 mole percent (based on the monomer units of the polymer) since at concentrations below 0.2 mole percent the effect of the ionic groups on the physical properties tends to be slight, while above 8 mole percent the ionomer tends to become difficult to melt fabricate. The sulfonated polymer may be purified and recovered as the free acid or neutralized with a basic compound such as ammonium hydroxide or methyl amine. Conversion of the free sulfonic acid to the quaternary phosphonium salt is readily obtained in solution by neutralization at a temperature in the range of about 0° to 50° C. with a quaternary phosphonium hydroxide. Where the sulfonic acid has been previously neutralized with a base, it may be exchanged for the quaternary phosphonium cation if the base is weaker than the quaternary hydroxide, or an acid salt of the quaternary phosphorus compound can be used if the acid is weaker than the sulfonic acid.

II. Carboxylic Polymers

A wide variety of polymers having one or more carboxylic acid groups covalently linked to carbon atoms comprising the polymer which are suitable for the preparation of the quaternary phosphonium ionomers of this invention have been described in the patent and general chemical literature. Carboxylic polymers particularly useful for the preparation of ionically cross-linked elastomers have been reviewed in "Ionic Polymers", referenced above and by Brown et al; Rubber Chem. & Technol., 28, 937 (1955); Boguslavskii; Soviet Rubber Technol., 18, 4 (1959); and Brown; Rubber Chem. & Technol., 36, 931 (1963). Non-limiting examples of useful polymers include interpolymers of acrylic and methacrylic acids with olefins and conjugated diolefins.

III. Quaternary Phosphonium Counterions

The preparation of halide salts and hydroxides of quaternary phosphonium compounds having the general formulae:

$$[PR'R''R'''R'''']^+ [X]^- \qquad (6)$$

$$^-[X]\ ^+[PR'R''R''']Q[R'R''R''''P]^+ [X]^- \qquad (7)$$

$$^-[X]\ ^+[PR'R''R''']Q[(R')P^+(R'')]Q[R'R''R'''P]^+$$
$$[X]^-[X]^- \qquad (8)$$

and $$T[PR'R''R''']_v^+ [X]_v^- \qquad (9)$$

wherein R', R", R'", and R"" are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_1$ to $C_{40}$ divalent straight and branched chain alkylene, cycloalkylene, arylene, dialkylene arylene radicals and substituted functional derivatives thereof and —(CHY)$_n$—Z$_m$—(CHY)$_n$ wherein Z is a heteroatom selected from the group consisting of oxygen and sulfur, $m$ is zero or one, Y is hydrogen or said $C_1$ to $C_{50}$ radicals and substituted functional derivatives of said radicals, $n$ is an integer from 1 to 10; $v$ is the valency of a polyvalent radical T; and $[X]^-$ is an anion selected from the group consisting of $OH^-$, $Cl^-$, $Br^-$ and $I^-$, are old in the art. The valency of T is 3–10, preferably 3 or 4. Mono and divalent hydrocarbyl groups and their substituted functional derivatives are defined in U.S. Pat. No. 3,929,849, herein incorporated by reference, and non-limiting examples of polyvalent radical (T above) are illustrated by $CH_3C(CH_2)_3$, $OH$ $CH_2C(CH_2)_3$, and $C(CH_2)_4$.

A partial list of quaternary phosphonium compounds which are suitable for the practice of this invention and general methods for their preparation is given in "Organo Phosphorus Compounds", G. M. Kosalapoff, John Wiley & Sons, New York, 1950 and in Organic Phosphorus Compounds, Vol. 2, Kosalapoff et al eds., John Wiley & Sons, New York, 1972. The preparation of novel quaternary phosphonium halides is disclosed in copending U.S. Patent Applns. Ser. Nos. 402,465 filed Oct. 1, 1973 and 493,253 filed July 31, 1974, now U.S. Pat. No. 3,929,849, which are herein incorporated by reference.

IV. Product Composition, Properties and Utility

Products which have a limited concentration of anionic groups covalently bonded to one or more carbon atoms comprising a polymer, when neutralized with polyvalent cations such as zinc, magnesium and aluminum, or polyamines are generally referred to as ionomers. The acidity of the unneutralized anionic polymer may vary over a wide range; useful acidities being in the range from 0.1 to 200 milliequivalents of hydrogen per 100 grams of the anionic polymer.

The ionomeric products of the instant invention may be characterized by the following general formulae:

$$\begin{array}{c} C \\ | \\ A^- \ [F]^+ \end{array}$$

wherein ~C~ is one or more carbon atoms in one or more molecules comprising a polymer; $A^-$ is one or more anionic acid radicals selected from the group consisting of sulfonic, carboxylic and phosphonic acids covalently bonded to one or more of said ~C~ carbon atoms; and $[F]^+$ is one or more of the mono or polyvalent quaternary phosphonium cations selected from the group of counterions defined in Formulas 6 to 9 inclusive, above.

In addition to the utility of these polymers discussed above, certain of the quaternary phosphonium sulfonate polymers possess the property of increased tensile strength and modulus when subjected to moisture. These ionomers are particularly useful as liners for water catchbasins in semi-arid regions having a sandy soil.

The following examples more fully illustrate the invention and demonstrate the contribution to the art.

EXAMPLE 1 - POLYMER SULFONIC ACID

An EPDM available on a commercial scale (VISTALON) from Exxon Chemical Co., New York, New York, which comprised about 52 wt. % of ethylene, 43 wt. % of propylene and 5 wt. % of 5-ethylidene-2-norbornene and had a number average molecular weight of about 35,000 and a Mooney viscosity ML at 100° C. (1 + 8 min.) of about 42 was sulfonated using acetyl sulfate in accordance with the method disclosed in U.S. Pat. No. 3,836,511. Analysis of the product showed a sulfur content of 0.86 wt. %. The product was stored at a temperature of −80° C for use in the following examples.

EXAMPLE 2 - QUATERNARY PHOSPHONIUM HYDROXIDES

Nine quaternary phosphonium hydroxides, prepared from the corresponding halides which were synthesized in accordance with the references and patent applications cited above, were prepared by the following method.

A percolation column having a height to diameter ratio of approximately 15:1 was packed with Amberlyst A-29, a commercially available anionic macroreticular ion-exchange resin marketed as the chloride salt by Rohm and Hass Co., Philadelphia, Pa. The resin was converted to the hydroxide form by slowly passing about 6.5 bed volumes of a 10 wt. % aqueous solution of reagent grade sodium hydroxide downwardly through the bed, followed by distilled water until the effluent had a pH of 7.0. The water in the column and in the resin was then displaced by percolating about 15 volumes of anhydrous methanol downwardly through the column.

The following quaternary phosphonium halides were converted to the hydroxide form in the following manner:

$[n\text{-}C_{22}H_{45}P(CH_3)_3]^+ \, Cl^-$ (1)

$[(C_6H_5)_4P]^+ \, Br^-$ (2)

$[(C_6H_5)_3P \, CH_3]^+ \, Cl^-$ (3)

$[(C_6H_5)_3P \, C_2H_5]^+ \, Br^-$ (4)

$[(C_6H_5)_3P \, n\text{-}C_3H_7]^+ \, Br^-$ (5)

$[(n\text{-}C_8H_{17})_3P\text{-}CH_2CH_2\text{-}P(n\text{-}C_8H_{17})_3]^{++} \, Cl_2^{--}$ (6)

$[(CH_3)_2CHCH_2)_3\text{-}P\text{-}CH_2CH_2\text{-}P(CH_2CH(CH_3)_2)_3]^{++} \, Cl_2^{--}$ (7)

$[(C_6H_5)_3P \, CH_2\text{-}C_6H_4\text{-}CH_2P(C_6H_5)_3]^{++} \, Br_2^{--}$ (8)

$[(C_6H_5)_3P\text{-}CH_2CH_2\text{-}P(C_6H_5)_3]^{++} \, Br_2^{--}$ (9)

Each of the above quaternary phosphonium halides was dissolved in about 300 ml. of a solvent consisting of either anhydrous methanol or ethanol, or mixtures of these alcohols with either benzene or cyclohexane depending on the solubility characteristics of the particular halide. The various solutions which ranged in concentration from about 0.5 to 20 grams of halide per 300 ml. of solvent were percolated through a freshly prepared column of the hydroxide form of the ion exchange resin. The receiver was blanketed with oxygen-free nitrogen, then sealed and refrigerated until used. Just before use an aliquot of each solution was titrated with standard alkali in order to check the basicity.

EXAMPLE 3 - QUATERNARY PHOSPHONIUM SALTS OF SULFO EPDM

A sulfonated EPDM prepared in the manner of Example 1 was dissolved at room temperature at a concentration of 20 grams per liter in a mixed solvent consisting of 95% by volume of toluene and 5% by volume of anhydrous methanol. The solution was filtered to remove any gel particles and on titration of a sample of the filtered solution was found to have an acidity equal to 0.56 milliequivalents per 100 ml. Aliquots of the solution were overbased with each of the quaternary phosphonium hydroxide solutions of Example 2 by the addition of 1.2 equivalents of the quaternary phosphonium hydroxide per equivalent of sulfonic acid. The solutions were stirred under nitrogen at room temperature for about 40 minutes, checked to confirm the basicity of the solutions and they made slightly acid by the addition of about 0.25 equivalents per equivalent of acidity originally present in the solution of a 2.5 wt. % solution of acetic acid in methanol.

The solutions were steam-stripped to remove the solvents and precipitate the ionomers as a crumb for about one-half hour at which time the polymers had lost any tendency toward tackiness. The solids were filtered and washed in a Waring Blender successively with methanol, distilled water and methanol. About 0.3 wt. % of the phenolic antioxidant was added to the polymer before each wash. The polymer crumb was air dried at room temperature and further dried for 7 days at room temperature under a vacuum of 8 torr. While all of the sulfonic groups in the above and subsequent examples were completely neutralized, i.e. 100% neutralization, in certain instances it is desirable to partially neutralize the anionic groups present in the polymer, e.g. 5 to 95% with the quaternary phosphonium hydroxides and leave some free acidity or complete the neutralization with a definite counterion.

EXAMPLE 4 - TENSILE STRENGTHS OF IONOMERS

Test pads from each of the ionomers prepared in Example 3 were compression molded at 160° C. using a preheat of 2 minutes and 3 minutes under pressure. Microtensile pads having a thickness of about 0.6 mm. and test regions measuring 2.54 mm. in width and 12.7 mm. in length were cut from the pads and placed in a vacuum oven maintained at 7 torr. and 48° C. for 3 days.

Tensile strengths of the samples were measured at 25° C. and 100° C. with an Instron TM table model instrument, using a pulling speed of about 51 mm. per minute. The results are given in Table I below.

TABLE I

| Sample No. | Quaternary Ion | Tensile-Kg/cm² 25° C. | 100° C. |
|---|---|---|---|
| 1 | $[C_{22}H_{45}P(Me)_3]^+$ | — | 6.5 |
| 2 |  | 201 | 1.4 |

TABLE I-continued

| Sample No. | Quaternary Ion | Tensile-Kg/cm² 25° C. | 100° C. |
|---|---|---|---|
| 3 | [(⌬)₃P Me]⁺ | 59.6 | 3.0 |
| 4 | [(⌬)₃P Et]⁺ | 154 | 6.9 |
| 5 | [(⌬)₃P Pr]⁺ | 69.5 | — |
| 6 | [(C₈H₁₇)₃P C₂H₄P(C₈H₁₇)₃]⁺⁺ | 11.3 | 1.6 |
| 7 | [(iso-Bu)₃P C₂H₄ P (iso-Bu)₃]⁺⁺ | 33.8 | 2.0 |
| 8 | [(φ)₃P C₂H₄P CH₂φCH₂P(φ)₃]⁺⁺ | 175 | 5.6 |
| 9 | [(φ)₃P C₂H₄P (φ)₃]⁺⁺ | 156 | 5.3 |

The results show that the tensile values strongly depend on the structure of the phosphonium counterions. These results will be discussed in detail with the additional data of Table II in Example 6.

EXAMPLE 5 — ADDITIONAL SULFO EPDM IONOMERS

A sulfonated EPDM prepared in the same manner as the product of Example 1, but at a lower sulfonation level was dissolved at a concentration of 20 grams per liter in a mixed solvent consisting of 95% toluene and 5% methanol by volume. The solution was filtered and on titration of a sample was found to have an acidity of 0.39 milliequivalents of hydrogen per 100 ml.

The following quaternary phosphonium hydroxides, prepared in the same manner as the hydroxides in Example 2 from halides, were used to neutralize aliquots of the sulfonated EPDM solution.

[(C₂H₅)₄P]⁺ [OH]⁻      (10)

[(C₄H₉)₄P]⁺ [OH]⁻      (11)

[C₁₈H₃₇P(C₂H₅)₃]⁺ [OH]⁻      (12)

[C₁₈H₃₇P(iso-Bu)₃]⁺ [OH]⁻      (13)

[(C₈H₁₇) P C₂H₅]⁺ [OH]⁻      (14)

[(C₈H₁₇)₃P CH₃]⁺ [OH]⁻      (15)

[(C₁₈H₃₇)₂P (C₂H₅)₂]⁺ [OH]⁻      (16)

[(C₂H₅)₃P (CH₂)₁₄P (C₂H₅)₃]⁺⁺ [OH]⁻      (17)

[C₁₈H₃₇P (CH₃)₃]⁺ [OH]⁻      (18)

The aliquots of the sulfonated EPDM solution were overbased, stirred for about 10 minutes, checked for basicity and slightly acidified with 2.5% acetic acid in the same manner as the samples prepared in Example 3. On neutralization when some of the samples became cloudy the solutions were clarified by the addition of toluene.

The products were recovered by precipitation with about 10 volumes of methanol, followed by settling and decantation of the supernatant liquid. Where settling was incomplete, the solutions were centrifuged to consolidate the precipitate. In some cases precipitation was incomplete as judged by the weight of recovered ionomer. Each of the recovered ionomers was overlaid with sufficient methanol to cover the product, 0.1% by weight (based on the weight of recovered product) of the phenolic antioxidant was added to each sample and after standing overnight the methanol was decanted and the products dried at room temperature in a vacuum oven for several days.

In order to compare the above quaternary phosphonium cations with a metallic cation, an aliquot of the sulfonated EPDM solution was neutralized with an alcoholic solution of sodium hydroxide and the product isolated by precipitation, inhibited and dried.

EXAMPLE 6 — TENSILE STRENGTH AND MELT INDEX

Test pads were prepared from each of the ionomers prepared in Example 5 and tensile strengths determined at 25° C. and 100° C. in the same manner as in Example 4. In addition, the melt indices of the polymers were determined at 150° C. using the standard capillary and instrument specified in ASTM 1238-70. The weight of the probe plus the added weight was 12.5 kilograms. Flow rates were measured electronically as probe displacement per minute and these results were converted to grams per 10 minutes using a conversion factor. The results are given in Table II.

TABLE II

| Sample No. | Structure of Counterion | Tensile-Kg/cm² 25° C. | 100° C. | Flow (a) Rate |
|---|---|---|---|---|
| 10 | [(C₂H₅)₄P]⁺ | 80.4 | 5.3 | 0.02 |
| 11 | [(C₄H₉)₄P]⁺ | 30.8 | 3.1 | 0.12 |
| 12 | [C₁₈H₃₇P(C₂H₅)₃]⁺ | 38.7 | 4.0 | 0.03 |
| 13 | [C₁₈H₃₇P(iso-Bu)₃]⁺ | 16.7 | 1.9 | 0.23 |
| 14 | [(C₈H₁₇)₃P C₂H₅]⁺ | 22.9 | 2.2 | 0.10 |
| 15 | [(C₈H₁₇)₃P CH₃]⁺ | 63.3 | 3.1 | 0.08 |
| 16 | [(C₁₈H₃₇)₂P(C₂H₅)₂]⁺ | 50.3 | 3.2 | 0.22 |
| 17 | [(C₂H₅)₃P(CH₂)₁₄P(C₂H₅)₃]⁺⁺ | 149 | 7.1 | 0.003 |
| 18 | [C₁₈H₃₇P(CH₃)₃]⁺ | 130 | 5.6 | 0.01 |
| 19 | Na⁺ | 63.3 | 16.2 | (Note b) |

Notes:
(a) Flow rate in grams per 10 minutes at 150° C.
(b) Flow rate less than 0.0004 grams per 10 min.

The results given in Tables I and II illustrate the wide range in physical properties of the ionomers that can be obtained by variation of the quaternary phosphonium cation. The results further indicate that small or controlled changes in the physical properties can be obtained by proper variation of the quaternary substituents. Thus, when one or more of alkyl radical substituents are lengthened, the flow rate at elevated temperature is increased thereby facilitating melt fabrication. For example, changing the methyl groups of the trimethyl octadecyl phosphonium cation of Sample 18 to ethyl groups (Sample 12) results in a product having increased flow rate but a lower tensile strength. Similarly, changing the methyl group of the trioctyl methyl phosphonium cation (Sample 15) to an ethyl group (Sample 14) results in a product having a higher flow rate and a reduced tensile strength. By varying the structure of the quaternary phosphonium counterion, the degree of acidity imparted to or inherent in the anionic polymer and the basic structure of the polymer, ionomers can be designed to optimize the balance between tensile strength and flow rate for a specified application. For example, the elastomeric ionomers prepared by neutralization of sulfonated EPDM with tetraphenyl phosphonium hydroxide (Sample 2) and octadecyl trimethyl phosphonium hydroxide (Sample 18) which possess tensile strengths at 25° C. of about 200 and 130 Kg/cm² respectively, would appear to be particularly useful as liners in catch basin applications.

Low strength elastomeric ionomers such as the octadecyl triisobutyl phosphonium salt of sulfonated EPDM (Sample 13 in Table II) have applications as hot sealants for joints which may experience alternate contraction and expansion or movement over time.

Among the ionomers in Tables I and II in which the sulfonated EPDM was neutralized with polyvalent quaternary phosphonium cations, those having short connecting alkylene chains (Samples 6 and 7) tend to be weaker than those with long connecting chains (Sample 17) or those ionomers having a phenylene connecting group (Sample 8) or triphenyl substituents, (Sample 9).

Some of the quaternary phosphonium salts of sulfonated EPDM which are listed in Tables I and II, such as $[(\text{iso-Bu})_3\text{P C}_2\text{H}_4\text{P}(\text{iso-Bu})_3]^{++}$ (Sample 7) and $[\text{C}_{18}\text{H}_{37}\text{P}(\text{C}_2\text{H}_5)_3]^+$ (Sample 12) showed increased or only slightly decreased tensile strengths and Young's modulii after being immersed in water at room temperature for about two weeks. On the other hand, with metal cations often substantial decreases in tensile strength and modulus occur after prolonged immersion in water.

The sulfonated EPDM which had been neutralized with the sodium cation (Sample 19) exhibited physical properties which were significantly different than the samples neutralized with the quaternary phosphonium cations. After two hours in the melt index rheometer the sodium neutralized product had not passed through the capillary so that the flow rate of 0.0004 grams per 10 minutes is an upper limit of the test. Test pads molded for tensile measurements were difficult to prepare because of the poor flow rate and were characterized by low elongations and moderate tensile at room temperature.

EXAMPLE 7 — QUATERNARY PHOSPHONIUM SALTS OF L.M. BUTYL

Low molecular weight butyl rubbers comprising interpolymers of isobutylene and $C_4$ to $C_{10}$ conjugated dienes having viscosity molecular weights ($M_v$) in the range of about 25,000 to about 60,000 and mole percent unsaturations in the range of about 3 to 4 percent are available commercially as "LM Butyl Rubber" from Exxon Chemical Co. A quantity of the LM Butyl was sulfonated to a 4 mole percent sulfonic acid content in accordance with the method disclosed in U.S. Pat. No. 3,642,728 and dissolved at a concentration of 35 grams per liter in a mixed solvent consisting of 80 percent toluene and 20 percent methanol. Quaternary phosphonium salts of the sulfonated LM Butyl were prepared from aliquots of the solution by the process detailed in Example 3 by neutralization with the following quaternary phosphonium hydroxides which were prepared from their respective halides by the process detailed in Example 2.

$$[(C_6H_{13})_3P\ CH_3]^+\ [OH]^{-\ 1++}_{\ \ \ \ 2}[OH]^- \quad (20)$$

$$[(C_6H_5)_3P\ CH_2CH_2P(C_6H_5)_3]^{++}_{\ \ 2}[OH]^- \quad (21)$$

$$[(C_8H_{17})_3P\ CH_2CH_2P(C_8H_{17})_3]^{++}_{\ \ 2}[OH]^- \quad (22)$$

The products were isolated as a crumb by steam stripping, after the addition of 0.3 weight percent of the phenolic antioxidant to the solutions and the crumb dried in a vacuum oven for 4 days at 40° C. The products had improved physical properties such as tensile strength when compared with the original LM Butyl rubber.

In common with elastomeric compositions, the ionomers of this invention may be compounded with a variety of other polymers, fillers, plasticizers, antioxidants and extenders.

Since quaternary phosphonium halides are readily synthesized from alkenes having terminal unsaturation, oligomers of ethylene, propylene and isobutylene, for example, having 100 or more carbon atoms may also be used to prepare the quaternary phosphonium cations.

What is claimed is:

1. Ionomers having the general formula $$C-A^-(F)^+$$

wherein C is one of a plurality of carbon atoms comprising a portion of the polymer backbone chain of carbon atoms or is in an acyclid, alicyclic or aromatic radical which is pendant to the backbone chain and wherein said $\sim C\sim$ is (1) in a single polymer molecule, (2) in the same polymer molecule, and (3) in different polymer molecules; A is one or more anionic acid radicals covalently bonded to one or more of said $\sim C\sim$ carbon atoms; and (F)+ is one or more mono or polyvalent quaternary phosphonium cationic counterions partially or completely neutralizing said anionic acid radicals.

2. Ionomers of claim 1 wherein said $A^-$ is one or more sulfonic acid groups ($—SO_3$).

3. Ionomers of claim 1 wherein [F]$^-$ is selected from the group of quaternary phosphonium counterions consisting of compounds having the general formula:

$$[P\ R'R''R'''R'']^+$$

$$^+[P\ R'R''R''']Q[R'R''R'''P]^+$$

$$^+[P\ R'R''R''']Q[(R')P^+(R'')]Q[R'R''R'''P]^+ \text{ and}$$

$$T\ [P\ R'R''R''']_v^+$$

wherein R', R", R''' and R'' are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_4$ to $C_{40}$ divalent straight and branched chain alkylene, cycloalkylene, arylene, dialkylene arylene radicals and substituted functional derivatives thereof and —(CHY)$_n$—$Z_m$—(CHY)$_n$— wherein Z is a heteroatom selected from the group consisting of oxygen and sulfur; m is zero or one; Y is hydrogen or said $C_1$ to $C_{50}$ radicals and substituted functional derivatives of said radicals; n is an integer from 1 to 10; and $v$ is the valency of a polyvalent hydrocarbon radical T; $v$ being 3–10.

4. Ionomers of claim 1 wherein said polymer is selected from the group consisting of:
   a. Homopolymers and interpolymers of one or more acyclic and alicyclic mono-olefins;
   b. Homopolymers and interpolymers of one or more alkenyl aromatic hydrocarbon monomers;
   c. Interpolymers of one or more $C_4$ to $C_{10}$ conjugated diolefins with one or more $C_8$ to $C_{12}$ vinyl aromatic hydrocarbons;
   d. Interpolymers of one or more $C_8$ to $C_{12}$ vinyl aromatic hydrocarbons with one or more $C_4$ to $C_{10}$ Type III mono-olefins;
   e. Elastomeric interpolymers of one or more $C_4$ to $C_{10}$ conjugated diolefins with one or more $C_4$ to $C_{10}$ Type III mono-olefins;

f. Homopolymers and interpolymers of one or more $C_{10}$ acyclic and alicyclic monoterpenes and $C_{15}$ sesquiterpenes;

g. Homopolymers and interpolymers of one or more $C_4$ to $C_{10}$ conjugated diolefins; and h. Interpolymers of one or more $C_2$ to $C_{18}$ Type I mono-olefins and one or more $C_6$ to $C_{12}$ acyclic and alicyclic non-conjugated diolefins.

5. Ionomer of claim 1 wherein said polymer is a polyethylene and said anionic group is a sulfonic acid.

6. Ionomer of claim 1 wherein said polymer is a polypropylene and said anionic group is a sulfonic acid.

7. Ionomer of claim 1 wherein said polymer is an interpolymer of ethylene and propylene and said anionic group is a sulfonic acid.

8. Ionomer of claim 1 wherein said polymer is butyl rubber and said anionic group is a sulfonic acid, said butyl rubber comprising interpolymers of isobutylene with butadiene, isoprene, piperylene, 1,3-hexadiene, 2,3-dimethyl-1,3-butadiene and cyclopentadiene.

9. Ionomer of claim 1 wherein said polymer is an EPDM elastomer and said anionic group is a sulfonic acid.

10. Ionomer of claim 1 wherein said anionic group is a sulfonic acid covalently bonded to said ~C~ carbon atoms in an amount in the range of from about 0.2 to about 8 mole percent.

11. Ionomer of claim 1, wherein said ionomer is an elastomer.

12. Ionomer of claim 1, wherein said ionomer has a concentration of said anionic groups between about 0.2 to about 8.0 mole percent and is water insoluble.

13. Ionomers of claim 1 wherein $[F]^+$ is selected from the group of quaternary phosphonium counterions consisting of compounds having the general formulae:

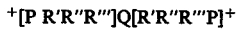

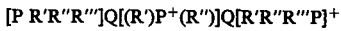

and

wherein R', R", R'" and R'$^v$ are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_4$ to $C_{40}$ divalent straight and branched chain alkylene, cycloalkylene, arylene, dialkylene arylene radicals and substituted functional derivatives thereof and —(CHY)$_n$—$Z_m$—(CHY)$_n$— wherein Z is a heteroatom selected from the group consisting of oxygen and sulfur; m is zero or one; Y is hydrogen or said $C_1$ to $C_{50}$ radicals and substituted functional derivatives of said radicals; n is an integer from 1 to 10; and v is the valency of a polyvalent radical T.

14. Ionomer of claim 1, wherein said polymer is a polyethylene.

15. Ionomer of claim 1, wherein said polymer is a polypropylene.

16. Ionomer of claim 1, wherein said polymer is an interpolymer of ethylene and propylene.

17. Ionomer of claim 1, wherein said polymer is an EPDM elastomer.

18. Ionomer of claim 1, wherein said polymer is a butyl rubber.

19. Ionomers having the general formula

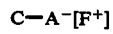

wherein ~C~ is an EPDM elastomer; $A^-$ is one or more sulfonic acid groups covalently bonded to said ~C~ carbon atoms in said EPDM elastomer in an amount in the range of from about 0.2 to about 8 mole percent.

20. Ionomers of claim 19 wherein $[F]^+$ is selected from the group of quaternary phosphonium counterions consisting of compounds having the general formulae:

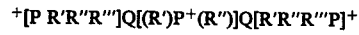

and

wherein R', R", R'" and R'$^v$ are independently selected from the group consisting of $C_1$ to $C_{50}$ straight and branched chain acyclic, alicyclic, aryl, alkylaryl and arylalkyl radicals and substituted functional derivatives thereof; Q is selected from the group consisting of $C_4$ to $C_{40}$ divalent straight and branched chain alkylene, cycloalkylene, arylene, dialkylene arylene radicals and substituted functional derivatives thereof and —(CHY)$_n$—$Z_m$—(CHY)$_n$— wherein Z is a heteroatom selected from the group consisting of oxygen and sulfur; m is zero or one; Y is hydrogen or said $C_1$ to $C_{50}$ radicals and substituted functional derivatives of said radicals; n is an integer from 1 to 10; and v is the valency of a polyvalent hydrocarbon radical T.

21. A composition comprising the ionomer of claim 1 and a filler.

22. A composition comprising the ionomer of claim 1 and an antioxidant.

23. A composition comprising the ionomer of claim 1 and another polymer.

24. A composition comprising the ionomer of claim 1 and an extender.

* * * * *